(No Model.)
F. O. CLAPP.
CARBOY PROTECTOR.
No. 597,760. Patented Jan. 25, 1898.
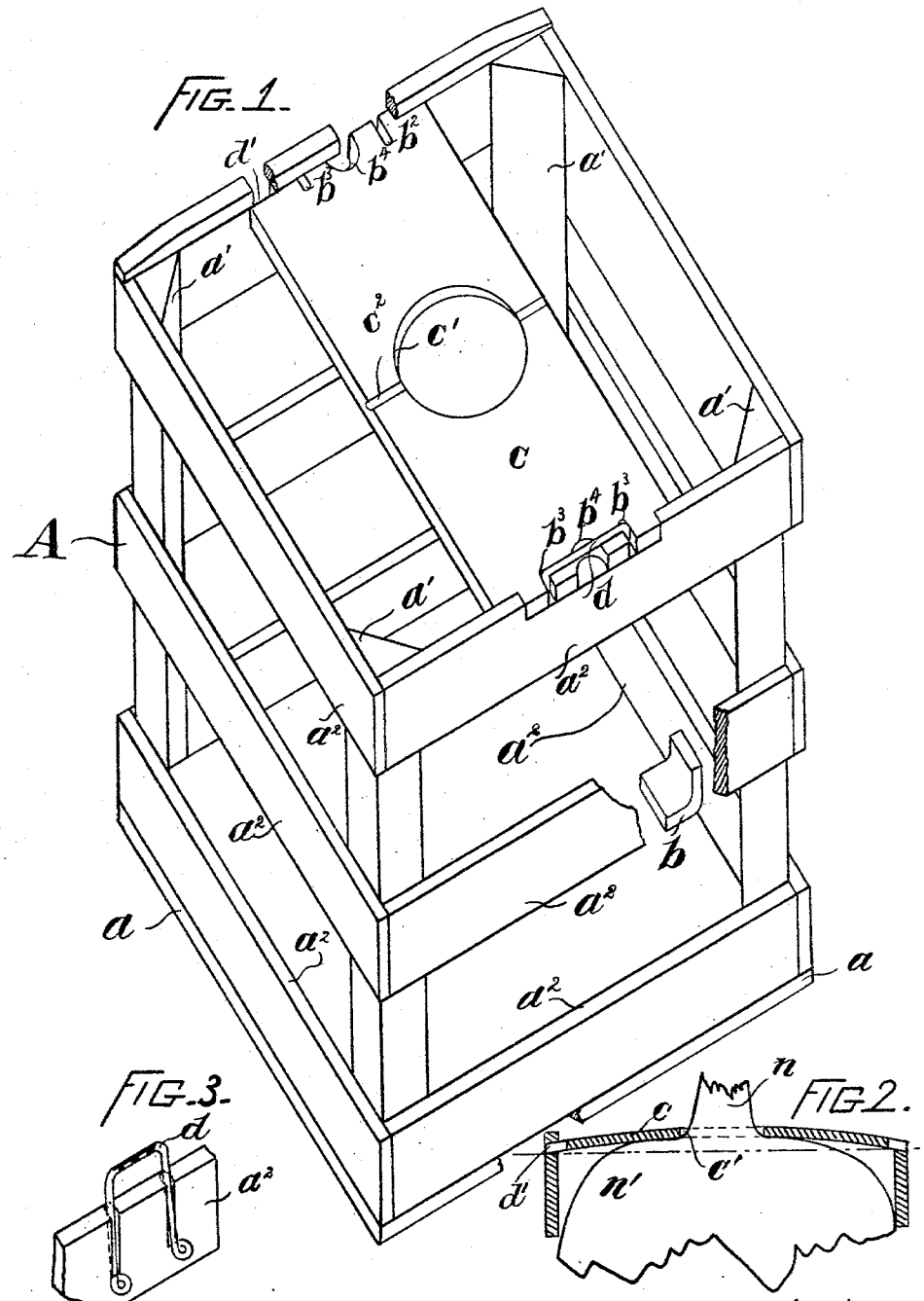
WITNESSES.
Harry O. Robinson
Arthur L. Randall
INVENTOR.
Frank O. Clapp
by B. J. Noyes atty

UNITED STATES PATENT OFFICE.

FRANK O. CLAPP, OF SCITUATE, MASSACHUSETTS.

CARBOY-PROTECTOR.

SPECIFICATION forming part of Letters Patent No. 597,760, dated January 25, 1898.

Application filed March 15, 1897. Serial No. 627,511. (No model.)

*To all whom it may concern:*

Be it known that I, FRANK O. CLAPP, of Scituate, county of Plymouth, State of Massachusetts, have invented an Improvement in Carboy-Protectors, of which the following description, in connection with the accompanying drawings, is a specification, like letters on the drawings representing like parts.

This invention relates to carboys, and has for its object to improve the construction of the carboy protector or crate, whereby the glass vessel which is contained within said crate shall be held in a yielding or springy manner above the bottom and away from the side walls of said crate.

In accordance with this invention a crate, which may be made in any usual manner, is provided with yielding or elastic cushions placed at the junction of its side walls and bottom at points substantially midway between the corners, so that the sides and bottom of the glass vessel will be yieldingly or elastically supported away from the side walls and above the bottom of said crate, and a spring-acting plate is detachably connected to the top of said crate, which has a hole through it, up through which the neck of said glass vessel projects, thus adapting said plate to retain the vessel in place within the crate, and said spring-acting plate is adapted to be pressed down hard onto the body portion or shoulder of said glass vessel to thereby firmly press said vessel down onto or against said yielding or elastic cushions. The spring-acting plate thus serves as a yielding retaining device for the vessel at the top of the crate. As a simple means of detachably connecting said spring-acting plate to said crate said plate may be formed in it at one or both ends two longitudinal slots and between them a thumb-hole, and said crate may have secured to one side wall a vertically-projecting spring-acting bail and may have formed in its opposite side wall a mortise or slot, and the slotted end of said spring-acting plate is adapted to be engaged by said spring-acting bail when its opposite end enters the mortise or slot.

Figure 1 is a perspective view of a carboy protector or crate embodying this invention with the glass vessel removed. Fig. 2 is a detail showing the spring-acting plate engaging or bearing upon the glass vessel, and Fig. 3 is a detail of the bail by which one end of the spring-acting plate is detachably connected to the crate.

A represents an open-sided box or crate which is adapted to contain within it a glass vessel. The said crate may be made in any desirable or suitable way so far as this invention is concerned, but I have herein shown it as composed of a bottom $a$ and upwardly-projecting corner-posts and several cross slats or strips $a^2$, the latter forming the side walls thereof. At the junction of the side walls and bottom of said crate yielding or elastic cushions $b$ are placed, which may be made of rubber or other suitable material, and said yielding or elastic cushions $b$ are adapted to support the glass vessel, so that its bottom will be elevated above the bottom of the crate and its side walls will be held away from the side walls of the crate. In Fig. 1 of the drawings I have shown one of said yielding or elastic cushions $b$, and I prefer to make said cushions of a single piece of rubber or other suitable material bent into a substantially right-angular shape, as shown in the drawings, and in practice four such cushions will be used, they being placed upon the bottom and against the side walls of the crate at points substantially midway between the corner-posts $a'$. A spring-acting plate $c$ is detachably connected with the top of said crate, which has a hole $c'$ through it, through which the neck $n$ of the glass vessel projects, (see Fig. 2,) and said spring-acting plate $c$ is pressed down hard upon or against the body portion or shoulder $n'$ of said glass vessel to thereby cause said vessel to be firmly pressed down upon or against the said yielding or elastic cushions $b$. Said plate $c$ consists of a rectangular strip of wood or other material, and it is herein shown as made spring-acting by weakening it transversely, as by forming in it a hole $c'$ for the neck of the bottle, and if said hole $c'$ does not weaken the plate $c$ sufficiently to allow its ends to be bent or sprung down and fastened, as shown in Fig. 2, transverse notches or grooves $c^2$ may be cut in said plate $c$ to further weaken it. As a simple means of detachably connecting said spring-acting plate $c$ to said crate A said plate has formed in one or both ends thereof two longitudinal slots $b^2\, b^3$, having between them a thumb-hole $b^4$, and said crate A has secured to one side wall, near its top, a vertically-projecting spring-acting bail $d$ (see Fig. 3) and has formed in its opposite side wall, near its top, a mortise or slot $d'$, and the slotted end of said spring-acting plate $c$ is adapted to be engaged by said vertically-projecting spring-acting bail, which projects into and through the slots, and thus embraces said end of the spring-acting plate, and the other end of said plate enters the mortise or slot $d'$, formed in the side wall of said crate A. By making slots $b^2\, b^3$ at both ends of said plate $c$ it is reversible end for end.

I do not wish to limit myself to the use of all of the features herein shown and described, as it is obvious that some of them may be used independent of the others.

I claim—

1. A carboy-protector consisting of a crate having elastic cushions at the junction of its side walls and bottom, a plate attached at its ends to the top of said crate, said plate being made spring-acting and having a hole through it for the neck of the carboy, thereby adapting it to bear forcibly upon or against the body portion or shoulder of said carboy and press it down firmly upon said elastic cushions, and also to retain said carboy in position in the crate, substantially as described.

2. A crate, a vertically-projecting spring-acting bail secured to one side wall and a mortise or slot formed in the opposite side wall thereof, a reversible spring-acting plate, either end of which is adapted to be engaged by said spring-acting bail, and the opposite end is adapted to enter the mortise, substantially as described.

3. A crate, a vertically-projecting spring-acting bail secured to one side wall and a mortise or slot formed in the other side wall thereof, a spring-acting plate, having a hole through it for the neck of the glass vessel, said plate having formed in it at one end two longitudinal slots and a thumb-hole between them, thus adapting it to be engaged by said spring-acting bail, which projects into and through said longitudinal slots, the opposite end of said plate entering the mortise or slot, substantially as described.

In testimony whereof I have signed my name to this specification in the presence of two subscribing witnesses.

FRANK O. CLAPP.

Witnesses:
 B. J. NOYES,
 HARRY O. ROBINSON.